US008904307B2

(12) United States Patent  
Omiya

(10) Patent No.: US 8,904,307 B2  
(45) Date of Patent: Dec. 2, 2014

(54) PARAMETER INPUT RECEIVING METHOD

(75) Inventor: Toshiyuki Omiya, Tokyo (JP)

(73) Assignee: P&W Solutions Co., ltd., Tokyo (JP)

( * ) Notice: Subject to any disclaimer, the term of this patent is extended or adjusted under 35 U.S.C. 154(b) by 688 days.

(21) Appl. No.: 12/305,532

(22) PCT Filed: Jun. 26, 2007

(86) PCT No.: PCT/JP2007/062761  
§ 371 (c)(1),  
(2), (4) Date: Dec. 18, 2008

(87) PCT Pub. No.: WO2008/001749  
PCT Pub. Date: Jan. 3, 2008

(65) Prior Publication Data  
US 2009/0210821 A1 Aug. 20, 2009

(30) Foreign Application Priority Data

Jun. 29, 2006 (JP) ................................. 2006-179524

(51) Int. Cl.  
G06F 3/048 (2013.01)  
G06F 3/0484 (2013.01)  
G06F 3/0482 (2013.01)

(52) U.S. Cl.  
CPC .......... *G06F 3/0482* (2013.01); *G06F 3/04842* (2013.01)  
USPC ............................ 715/808; 715/809; 715/824

(58) Field of Classification Search  
CPC ... G06F 3/30482; G06F 3/0484; G06F 3/048; G06F 3/0482  
USPC .......... 715/808, 809, 810, 813, 825, 828, 829  
See application file for complete search history.

(56) References Cited

U.S. PATENT DOCUMENTS

2003/0061323 A1* 3/2003 East et al. ...................... 709/223  
2003/0184600 A1* 10/2003 Lin-Hendel ................... 345/853  
(Continued)

FOREIGN PATENT DOCUMENTS

| JP | 05-314269 | 11/1993 |
| JP | 2000-231432 | 8/2000 |
| JP | 2006-59155 | 3/2006 |

OTHER PUBLICATIONS

Selecting TreeView Item with Right Click, codeguru.com/forum/index.php, date access May 4, 2011, date public Jun. 8, 2004, 1 page.*

Primary Examiner — Omar Abdul-Ali  
Assistant Examiner — Phuong Nguyen  
(74) Attorney, Agent, or Firm — Scully, Scott, Murphy & Presser, P.C.

(57) ABSTRACT

It is an object of the present invention to provide a method for reducing a user's operation procedures in a pop-up menu and for effectively locating the user's desired processing. A computer (1) displays a pop-up menu based on a list of at least one processing item stored in advance at a position designated by data indicative of a display request in a display unit (14) in response to receipt of the data indicative of the display request of the pop-up menu through an input unit (13). While continuing the display of the pop-up menu in response to receipt of data through the input unit (13) indicative of one processing item selected from the list, the computer (1) displays a form for receiving a parameter input corresponding to the processing item, receives input data for the form through the input unit (13), and stores the data as parameters of the processing item.

10 Claims, 7 Drawing Sheets

(56) References Cited

U.S. PATENT DOCUMENTS

2003/0233637 A1* 12/2003 Martin ............................ 717/134
2004/0217947 A1* 11/2004 Fitzmaurice et al. ......... 345/183
2005/0289470 A1* 12/2005 Pabla et al. .................... 715/751
2006/0123357 A1*  6/2006 Okamura ....................... 715/786
2006/0285868 A1* 12/2006 Holmes ............................ 399/81

* cited by examiner

| OPERATION | POINTER POSITION | PROCESS |
|---|---|---|
| RIGHT-CLICK | – | DISPLAY MENU RELATED TO OBJECTS SELECTED AT POINTER POSITION |
| LEFT-CLICK | ON MENU | CARRY OUT PROCESS (IF PARAMETERS ARE NOT REQUIRED) DISPLAY INPUT FORM (IF PARAMETERS ARE REQUIRED) |
| | OFF MENU | CLEAR MENU AND CARRY OUT PROCESS ACCORDING TO PARAMETERS |

PARAMETER INPUT RECEIVING METHOD

TECHNICAL FIELD

The present invention relates to a method and program for accepting input of parameters to software.

BACKGROUND ART

Conventionally, in application software running on a computer, there are cases in which input of parameters for command instructions for processing, input or changes of properties, or the like are accepted. As a result, pop-up menus are used in many cases as one type of user interface.

For pop-up menus, a screen is displayed in response to, for example, a right-click of a mouse operated by a user, and by selection of a processing item from a displayed list, a corresponding process is executed. At that time, in a case where parameter input is required, a dialog box provided for this purpose is displayed, and input is accepted while execution of processing is triggered by pressing of the "run" button or the like provided in the dialog box.

Here, in application software, the more functions provided, the more processing items are displayed in pop-up menus, so it can also be considered that, for a user, an amount of time to search for a desired processing item increases.

Therefore, a method is proposed for improving a user interface with this kind of possibility of reducing convenience. For example, in Patent Document 1, a method is disclosed in which, by enabling effective display of a shortcut menu (pop-up menu) composed of a plurality of (many) levels, operability of the shortcut menu is increased, and it becomes possible for a user to carry out the user's desired processes more quickly.

[Patent Document 1] Japanese Unexamined Patent Application Publication No. 2006-59155

DISCLOSURE OF THE INVENTION

Problems to be Solved by the Invention

However, even by using the above-mentioned method, the pop-up menu and the dialog box for running the actual action are not displayed simultaneously, and the dialog box corresponding to each processing item is separated from the pop-up menu. Therefore, since a user cannot search for a processing item in a pop-up menu while confirming a dialog box, there is the issue that, until the dialog box is opened, there is no way to determine whether that is the target processing item.

Furthermore, since a dialog box, once displayed, is processed independently of display/non-display of a pop-up menu, unless explicit operation to close a screen by a user (pressing a cancel button or the like), or an operation to run a process (pressing an OK button or the like), is accepted, the screen is not closed. As a result, if it were possible to display/not display a dialog box in tandem with a pop-up menu, there is a possibility that a number of operational procedures of a user could be reduced.

Therefore, the present invention has objects of, by displaying an input form (dialog box) in tandem with a pop-up menu, reducing a number of operational procedures of a user, and further, providing a method for efficiently searching for a process that the user desires.

Means for Solving the Problems

More specifically, in order to achieve the above-mentioned objectives, the following is provided.

In a first aspect, a method for displaying, on a computer operated by a user, a pop-up menu on a display unit, accepting input of parameters from the user for software running on the computer, comprises steps of:

accepting data indicating a display request for the pop-up menu through an input unit of the computer, displaying the pop-up menu based on a list composed of at least one pre-stored processing item, at a position indicated by data representing the display request in the display unit, according to an accepting of the display request, displaying a form for accepting input of the parameters corresponding to the processing items, while continuing display of the pop-up menu, according to an accepting of data through the input unit indicating a selection of one processing item from the list, and accepting input data corresponding to the form through the input unit, and storing the input data as parameters of the processing item.

According to this configuration, a computer realizing the method, through an input unit of the computer, accepts data indicating a display request for a pop-up menu, and according to an accepting of the display request, at a position indicated by data representing the display request in a display unit of the computer, displays the pop-up menu based on a list composed of at least one pre-stored processing item. Then, according to an accepting through the input unit of data indicating a selecting of one processing item from the list, while continuing display of the pop-up menu, the computer displays a form for accepting input of the parameters corresponding to the processing item. Next, the computer accepts input data corresponding to the form through the input unit, and stores the input data as parameters of the processing item.

As a result, a computer realizing the method displays a form for accepting parameters from a user, together with a pop-up menu, functioning as a portion of a menu, and thus, it is possible to enable completion of input of parameters within a pop-up menu.

In other words, it is possible to conduct, in tandem with display/clearing of a pop-up menu; e.g., processing according to parameters at a time of clearing of the pop-up menu. Therefore, the user can eliminate such steps as explicitly indicating process execution after entering parameters for displaying a dialog box.

In addition, it is possible to construct a form for accepting input of parameters including text boxes, radio buttons, check boxes, combo boxes, help links, balloon help, and the like.

In a second aspect, the method described in the first aspect, wherein the list is a tree structure composed of a plurality of levels, further comprises a step of displaying, in a case in which the processing item is selected for which a lower level exists, a pop-up menu based on processing items included in the lower level.

According to this configuration, it is possible for a computer realizing the method to give a hierarchy to a pop-up menu. As a result, there is a possibility that a user, by following a list divided into groups, can efficiently search for a desired processing item.

In a third aspect, the method described in the first or second aspect further comprises a step of clearing, during display of the form, in a case in which a separate processing item from the processing item is selected, display of the form, and of displaying a form corresponding to the separate processing item.

According to this configuration, it is possible for a computer realizing the method, from a list displayed in a pop-up menu, in a case where a plurality of processing items are consecutively selected by a user, to display forms sequentially according to each selection.

As a result, it is possible for a user to search for a desired processing item while looking at a form in which the contents of the processing can be easily understood. In other words, since it is possible to select and run processing items while confirming actual processing content difficult to understand only by processing item names displayed in a pop-up menu, the possibility of the user selecting an incorrect processing item decreases, and it is possible to increase processing efficiency.

In a fourth aspect, the method described in any one of the first to third aspects further comprises a step of clearing, in a case wherein the input unit indicates a portion of the screen other than that of the pop-up menu or the form displayed in the display unit, display of the pop-up menu and the form.

According to this configuration, it is possible for a computer realizing the method to clear a no longer necessary parameter input form in tandem with clearing of a pop-up menu. As a result, the user can complete up to input of parameters as a part of using a pop-up menu, and it is possible to eliminate such procedures as explicit run or screen close commands that were necessary in the case of conventional dialog boxes.

In a fifth aspect, the method described in any one of the first to fourth aspects further comprises steps of: accepting, from among a plurality of objects displayed on the display unit, data indicating at least one selection through the input unit, and reading a partial list of processing items pre-associated with the object;

wherein display of the pop-up menu is based on the partial list.

According to this configuration, a computer realizing the method, from among a plurality of objects displayed on the display unit, accepts data indicating at least one selection through the input unit, then reads a partial list of processing items pre-associated with the objects, and based on the partial list, displays the pop-up menu.

As a result, it is possible for a computer realizing the method to display pop-up menus restricted to processing items related to the selected object. As a result, since processing items unrelated to objects on which the user wishes to operate are not displayed, there is a possibility that the user can search for desired processing items efficiently.

According to a sixth aspect, in the method described in the fifth aspect, in a step of accepting data indicating a display request for the pop-up menu, a position indicated by the input unit in the display unit is not restricted to the display position of the selected object.

According to this configuration, it is possible for a computer realizing the method to display a pop-up menu at a position unrelated to a selected object. As a result, it is possible for a user to conduct selection of an object and display of a pop-up menu related to the object separately. Therefore, it is possible to select/run a processing item at an arbitrary position on the display unit. Thus, it is possible to eliminate the procedure of adjusting a pointer of a mouse cursor or the like to a prescribed position.

According to a seventh aspect, in the method described in the fifth or sixth aspect, processing items included in the list, and not included in the partial list, are displayed in the pop-up menu in a state in which they cannot be selected.

According to this configuration, it is possible for a computer realizing the method to display a pop-up menu after distinguishing between processing that can be carried out on the selected object and processing that cannot. As a result, there is a possibility that, since the user is made to recognize processing that can be conducted and processing that cannot, for the user, this invention will assist with object selection and processing item selection.

In an eighth aspect, a computer program, which displays a pop-up menu on a display unit of a computer operated by a user, and which accepts input of parameters from the user for software running on the computer, executes steps of:

accepting data indicating a display request for the pop-up menu through an input unit of the computer, displaying the pop-up menu based on a list composed of at least one pre-stored processing item, at a position indicated by data representing the display request in the display unit, according to an accepting of the display request, displaying a form for accepting input of the parameters corresponding to the processing items, while continuing display of the pop-up menu, according to an accepting of data through the input unit indicating selection of one processing item from the list, and accepting input data corresponding to the form through the input unit, and storing the input data as parameters of the processing item.

According to this configuration, by running the program on the computer, it is possible to expect similar effects as with the first aspect.

According to a ninth aspect, in the computer program described in the eighth aspect, the list is a tree structure composed of a plurality of levels, such that, in a case in which the processing item is selected for which a lower level exists, the program additionally executes a step of displaying a pop-up menu based on processing items included in the lower level.

According to this configuration, by running the program on the computer, it is possible to expect similar effects as with the second aspect.

According to a tenth aspect, in the computer program described in the eighth or ninth aspect, the program additionally executes a step of clearing, during display of the form, in a case in which a separate processing item from the processing item is selected, display of the form, and of displaying a form corresponding to the separate processing item.

According to this configuration, by running the program on the computer, it is possible to expect similar effects as with the third aspect.

According to an eleventh aspect, in the computer program described in any one of the eighth to tenth aspects, the program additionally executes a step of clearing, in a case wherein the input unit indicates a portion of the screen other than that of the pop-up menu and the form displayed in the display unit, display of the pop-up menu and the form.

According to this configuration, by running the program on the computer, it is possible to expect similar effects as with the fourth aspect.

According to a twelfth aspect, the computer program described in any one of the eighth to eleventh aspects additionally executes steps of: accepting, from among a plurality of objects displayed on the display unit, data indicating at least one selection through the input unit, and reading a partial list of processing items pre-associated with the objects;

wherein display of the pop-up menu is based on the partial list.

According to this configuration, by running the program on the computer, it is possible to expect similar effects as with the fifth aspect.

In a thirteenth aspect, the computer program described in the twelfth aspect is characterized in that, in the step of accepting data indicating a display request for the pop-up menu, a position indicated by the input unit in the display unit is not restricted to the display position of the selected object.

According to this configuration, by running the program on the computer, it is possible to expect similar effects as with the sixth aspect.

In a fourteenth aspect, the computer program described in either the twelfth or thirteenth aspect is characterized in that processing items included in the list, and not included in the partial list, are displayed in the pop-up menu in a state in which they cannot be selected.

According to this configuration, by running the program on the computer, it is possible to expect similar effects as with the seventh aspect.

In a fifteenth aspect, a storage medium stores the program described in any one of the eighth to fourteenth aspects.

According to this configuration, by inserting the storage media into the computer and running the programs, it is possible to expect similar effects as with each of the first to seventh aspects, respectively.

Effects of the Invention

According to the present invention, by displaying an input form in tandem with a pop-up menu, it is possible to reduce operational procedures of a user, and additionally, to enable a user to search for a desired process efficiently.

PREFERRED MODE FOR CARRYING OUT THE INVENTION

A preferred embodiment of the present invention is explained below with reference to the drawings.

Configuration of the Computer

Figure 1:
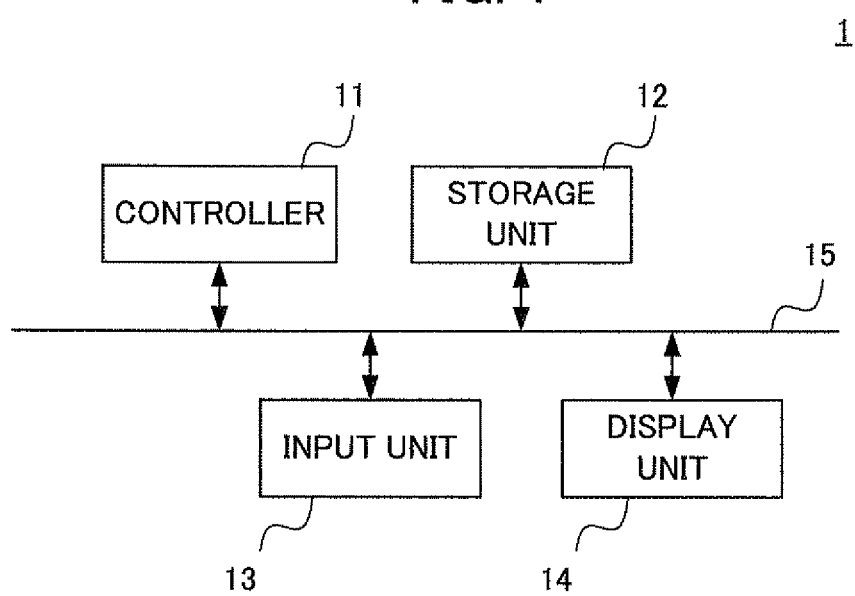
FIG. 1 is a block drawing depicting a configuration of the computer 1 relating to a preferred embodiment of the present invention.

FIG. 1 is a block drawing indicating a configuration of the computer 1 related to a preferred embodiment of the present invention.

A controller 11, a storage unit 12, an input unit 13, and a display unit 14 are connected together through a bus 15.

The controller 11 is a central processing unit (CPU) which carries out computation of information and processing, and performs control of the computer 1 overall. The controller 11, by appropriately reading and running various programs stored in the storage unit 12, cooperates with the above-described hardware, and realizes various functions related to the present invention.

The storage unit 12 may include local memory for use in running programs in combination with the controller 11, high-capacity bulk memory, and cache memory used for efficiently searching of the bulk memory. As computer-readable media for realizing the storage unit 12, media which is realized electrically, magnetically, optically, or electromagnetically may be included. More specifically, semiconductor memory devices, magnetic tape, floppy (registered trademark) disks, random access memory (RAM), read-only memory (ROM), and optical disks including CD-ROM's, CD-R/W's, and DVD's are included.

The input unit 13 is a device for accepting input by a user, and may include a keyboard, pointing device, and the like. The input unit 13 may be connected to the computer 1 either directly or through an intermediate I/O controller.

The display unit 14 is a device for displaying a screen to a user for accepting input of data, or for displaying a screen of computation process results by the computer, and includes a cathode-ray tube (CRT) display device, a liquid-crystal display (LCD), or the like. The display unit 14 may be connected to the computer 1 either directly or through an intermediate I/O controller.

Processing Flow

Figure 2:
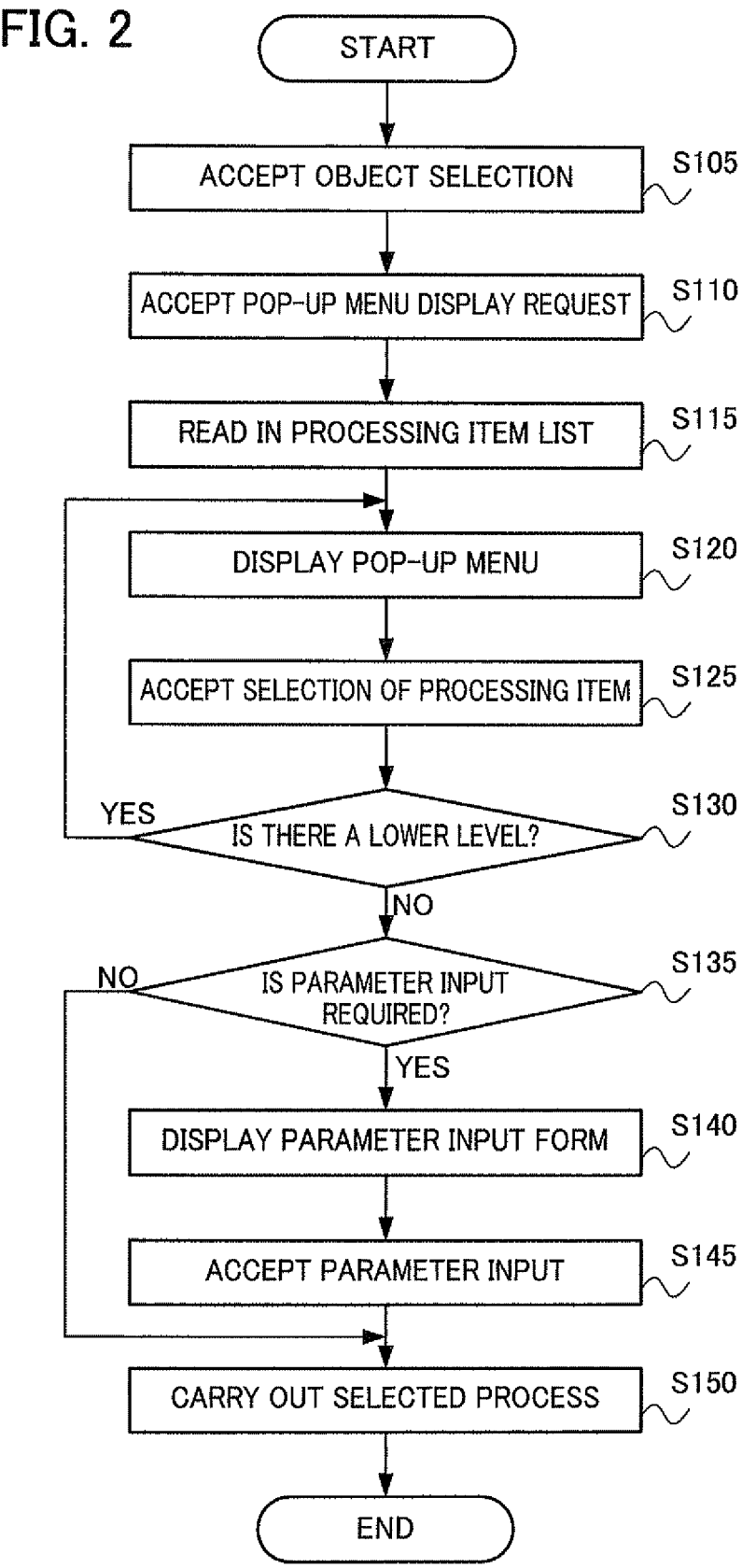
FIG. 2 is a flowchart depicting a flow of processing relating to a preferred embodiment of the present invention.

FIG. 2 is a flowchart illustrating a flow of processing related to a preferred embodiment of the present invention. The processing, in software to be run on the computer 1, is carried out by the controller 11 appropriately reading data from the storage unit 12.

In Step S105, the controller 11, from among objects displayed by the software, accepts one or a plurality of selections by a user from the input unit 13. More specifically, e.g., the user, by left-clicking on a mouse, selects an object pointed to by the current mouse pointer. Alternatively, a plurality of objects may be selected by a drag operation of the mouse.

In Step S110, the controller 11 accepts a display request of a pop-up menu relating to the object selected in Step S105 from the input unit 13. More specifically, e.g., a right-click operation of a mouse by a user is detected by the input unit 13, and data indicating the operation is sent to the controller 11. The controller 11, according to a receiving of the data, carries out the following step.

In Step S115, the controller 11, in relation to the objects selected in Step S105, reads from the storage unit 12 a processing item list for displaying in the pop-up menu.

Here, the processing item list may be set to relate only to the objects, or the list may encompass all processing items in which data indicating whether the process may be carried out on the object may be added.

In Step S120, the controller 11, based on the processing item list read in Step S115, displays the pop-up menu on the display unit 14. At this time, in a case in which the processing item list is a list that relates only to the selected objects, the controller 11 displays in a pop-up menu all of the processing item list as selectable items.

On the other hand, in a case in which the processing item list includes processing items that cannot be executed on the selected objects, based on the additional classification of whether the process can be executed or not, an aspect is changed for each item and displayed. More specifically, for example, in a case in which the processing item is an item that cannot be executed, the state of the item may be set to non-executable, and the display color may be changed.

Moreover, a position for displaying a pop-up menu is a position pointed to by the input unit 13 in the display unit 14.

For example, if the input unit 13 is a mouse, when a right-click is accepted, a pop-up menu is displayed at a position indicated by the mouse pointer. This pop-up menu is not limited to a position of the object selected in Step S105, but may be displayed at a position preferred by the user.

In Step S125, the controller 11, from the pop-up menu displayed in Step S120, accepts a selection of a processing item by a user. More specifically, for example, in a case in which the input unit 13 operated by the user is a mouse, the controller 11 determines that the processing item displayed at a position pointed to by the mouse pointer when a left-click is accepted has been selected.

In Step S130, the controller 11, in relation to the processing item selected in Step S125, determines whether the lower-level list exists. It is possible to set up the processing item list as a hierarchical tree structure, and in that case, in this step, the presence of a lower level is determined, and if a lower level exists, the process returns to step S120, and the processing item list of that level is displayed as a pop-up menu.

In Step S135, the controller 11, in relation to the selected processing item, determines whether parameter input is necessary. In a case in which parameters are not required, since the controller 11 can carry out processing at the point when the processing item is selected, the process transitions to Step S150, and the process is completed. On the other hand, in a case in which parameters are required for carrying out processing, the controller 11, in order to request input from the user, transitions processing to Step S140.

In Step S140, the controller 11, in order to accept input from the user, displays a parameter input form. The input form is displayed at a display position of the processing item selected in Step S125. As a result, it is possible to handle the input form as one level of a pop-up menu, so it is possible to allow the user to experience the simplicity of completing input just by menu operation.

In Step S145, the controller 11 accepts parameter input from the user. More specifically, for example, in the input form displayed in Step S140, text boxes, radio buttons, and the like are placed, and as a result, parameters entered by the user are stored in the storage unit 12 in preparation for process execution.

In Step S150, the controller 11 carries out the selected processing. In a case in which a parameter is required (in a case of a transition from Step S145), parameters stored in Step S145 are read out, and the processing is carried out. In a case of transition from Step S135, the controller 11 carries out the processing without requiring parameters.

Correspondence Chart of User Operations and Processing

Figures 3, 4:
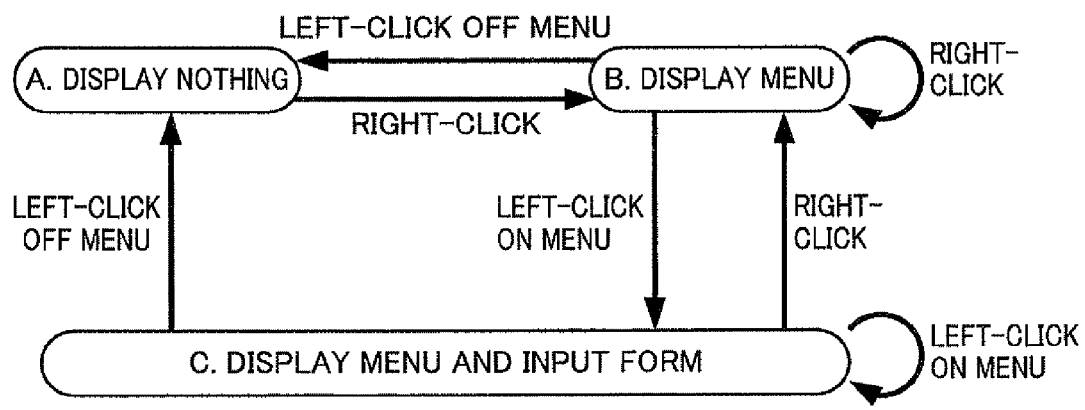
FIG. 3 is a drawing depicting a correspondence between operations by a user and processing concerning a pop-up menu, relating to a preferred embodiment of the present invention.
FIG. 4 is a drawing depicting state-transitions relating to a preferred embodiment of the present invention.

FIG. 3 is a drawing representing a correspondence between operations by a user and processing concerning a pop-up menu, relating to a preferred embodiment of the present invention. Moreover, we explain assuming that the input unit 13 is a mouse, and that the pop-up menu does not have a hierarchical structure.

In a case in which a mouse is right-clicked, the controller 11, at a position of a mouse pointer, displays a pop-up menu related to objects selected at that time. The position of the mouse pointer and the position of the selected object may be unrelated, and in that case, it is possible to display a pop-up menu at a location separate from the object.

On the other hand, in a case in which the mouse is left-clicked, processing differs depending on whether the position of the mouse pointer is on the pop-up menu.

In a case in which the mouse pointer is on the menu, the controller 11 carries out the processing item pointed to by the mouse pointer. At this time, in a case in which parameters related to the processing item are required, a parameter input form is displayed, and input from the user is accepted.

In a case in which the mouse pointer is at a position other than on the menu, the controller 11 clears the displayed pop-up menu. At this time, processing according to parameters entered on the above-described parameter input form are also carried out. As a result, it is not necessary for the user explicitly to carry out instructional operations of pressing a run button or the like, and since processing is carried out in tandem with clearing of the pop-up menu, processing by a user is simplified.

State Transition Diagram

FIG. 4 is a drawing representing state-transitions relating to a preferred embodiment of the present invention. Based on correspondence between user operations and processing, the drawing indicates transitions of display state related to a pop-up menu.

In the drawing, the three states of State A in which no pop-up menu is displayed, State B in which a pop-up menu is displayed, and State C in which an input form is displayed, are indicated. Between each state, by click operations of a mouse by a user, transitions occur.

By a right-click of a mouse, a transition is carried out from State A or State C to State B. This means a display of a pop-up menu. For example, in State C, even if an input form is displayed, a pop-up menu is newly re-displayed. Also, even if the display state is already in State B, by a right-click operation of a mouse, a pop-up menu is newly displayed at the position indicated by the mouse pointer at that time, and State B continues.

Next, in a case in which a left-click of a mouse on a processing item displayed in a pop-up menu is carried out, the state transitions from State B to State C. This means a display of an input form for parameter input.

Here, the transition from State C to State C represents a case of a selection of a different processing item in the pop-up menu when left-clicked. That is, without closing the displayed pop-up menu, the user, while sequentially selecting processing items, can visually compare with the input form.

Next, in a case in which the mouse is left-clicked at a position other than where the pop-up menu is displayed, the state transitions from either State B or State C to State A. This indicates to finish display of the pop-up menu, and to wait for another display request of the pop-up menu (right-click).

Moreover, if the pop-up menu is closed, the controller 11 fixes the parameters accepted on the above-described input form, and stores them in storage unit 12. Thus, the series of processes related to accepting parameter input from the user is completed.

EXAMPLES

FIGS. 5 to 8 indicate examples of pop-up menus relating to a preferred embodiment of the present invention.

Figure 5:
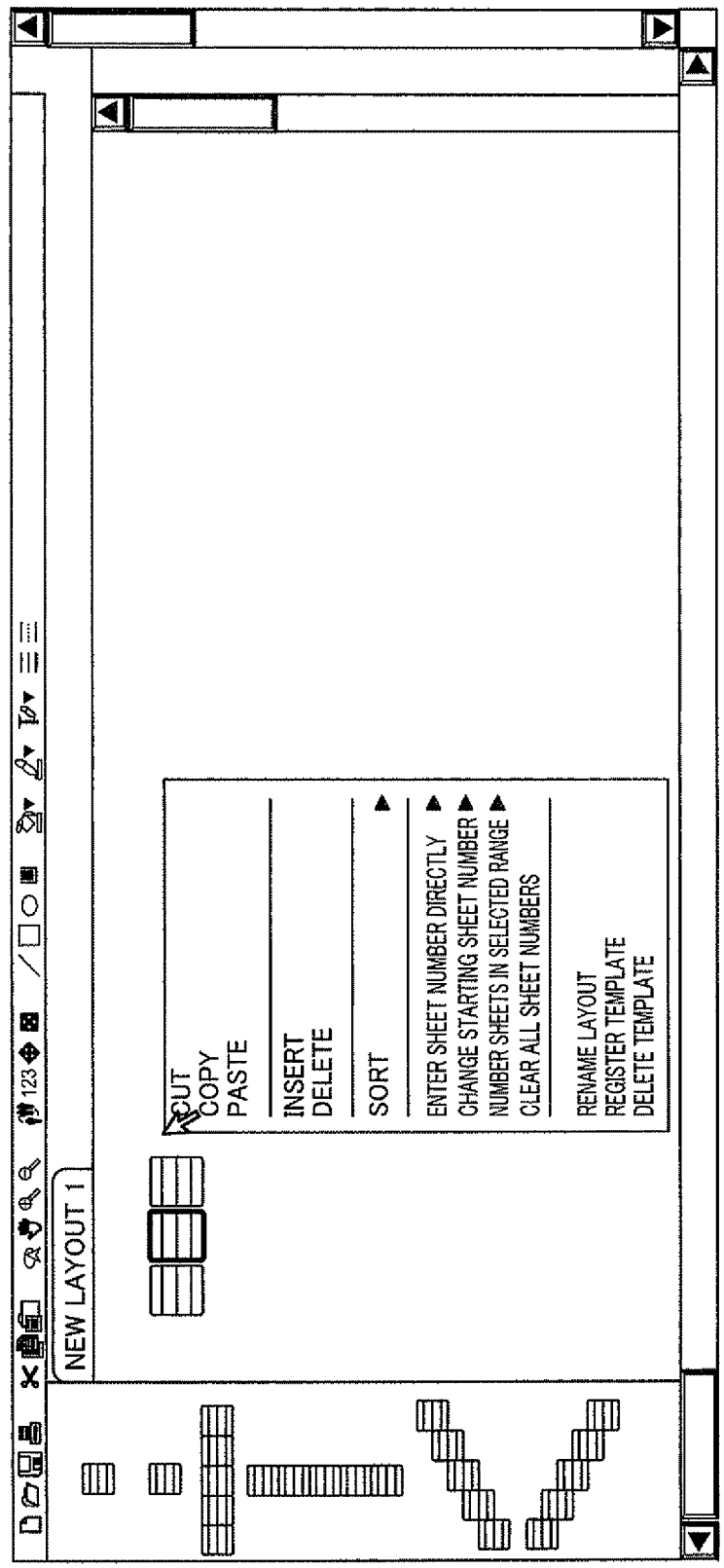
FIG. 5 is a drawing depicting examples of a pop-up menu relating to a preferred embodiment of the present invention.

FIG. 5 is a state in which a pop-up menu is displayed at a position of a mouse pointer. Here, of the three objects on the left of the screen, the center object has already been selected, and the processing items displayed in the pop-up menu are those related to the object.

Figure 6:
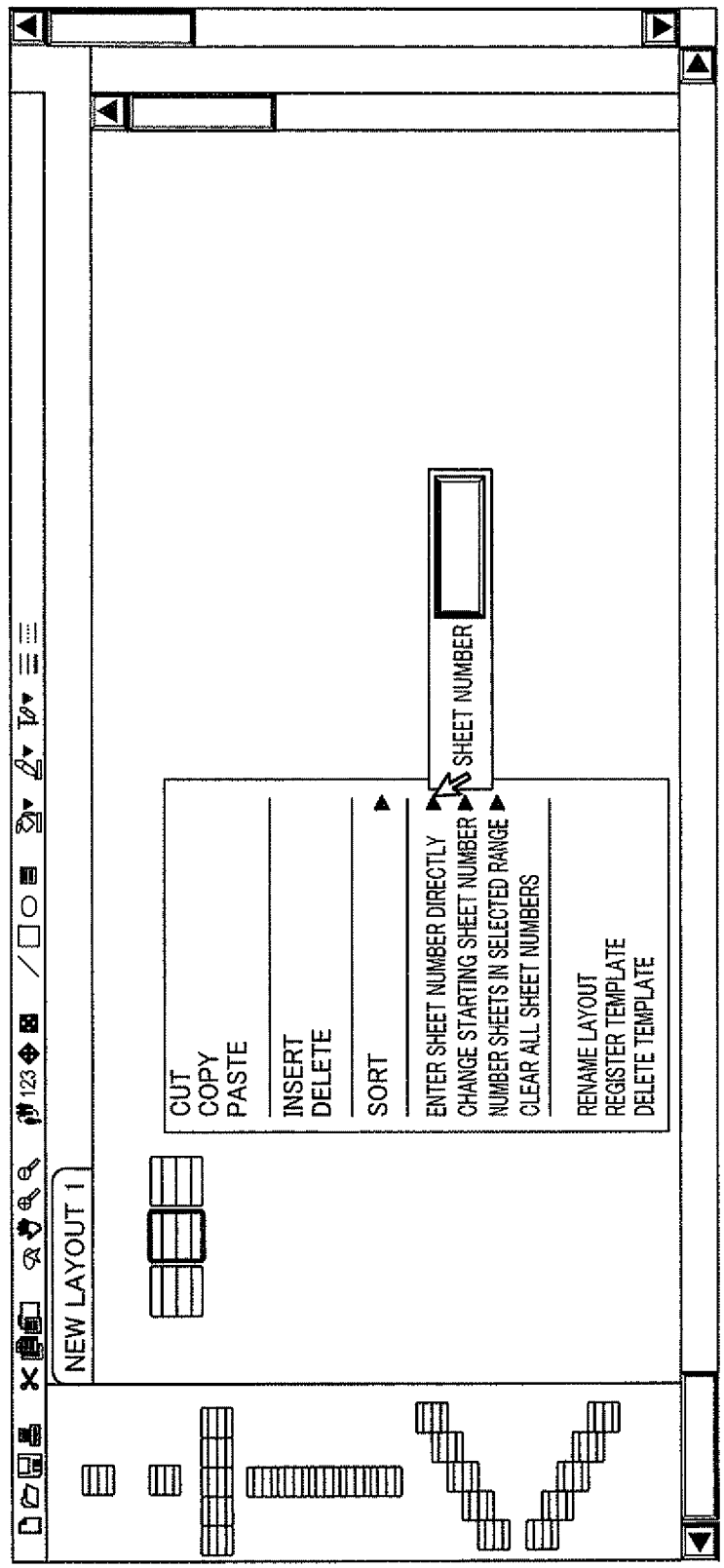
FIG. 6 is a drawing depicting examples of a pop-up menu relating to a preferred embodiment of the present invention.

FIG. 6 is a situation where, from the pop-up menu, when a processing item (in this case, "Enter sheet number directly") is selected, an input form is displayed. In this example, a text box accepting input from a user in the input form is provided.

Figure 7:
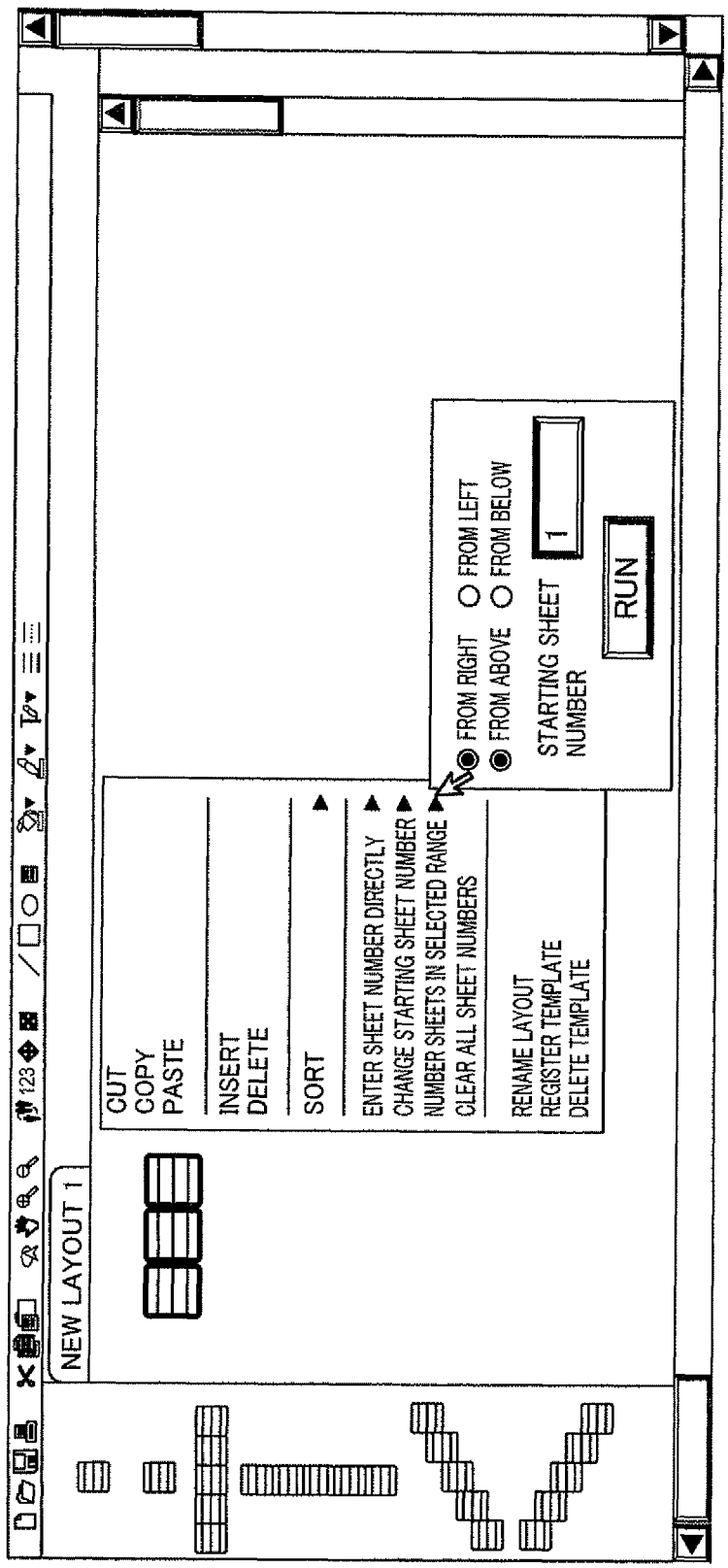
FIG. 7 is a drawing depicting examples of a pop-up menu relating to a preferred embodiment of the present invention.

FIG. 7, similarly to FIG. 6, illustrates a state displaying an input form when a processing item (in this case, "Number sheets in selected range") is selected. In this example, in the input form, radio buttons and a text box are provided. Moreover, the input form has a run button, and, for example, as described above, the form may be constituted so as to carry out processing when the pop-up menu closes, and in that case, the run button would be unnecessary.

Figure 8:
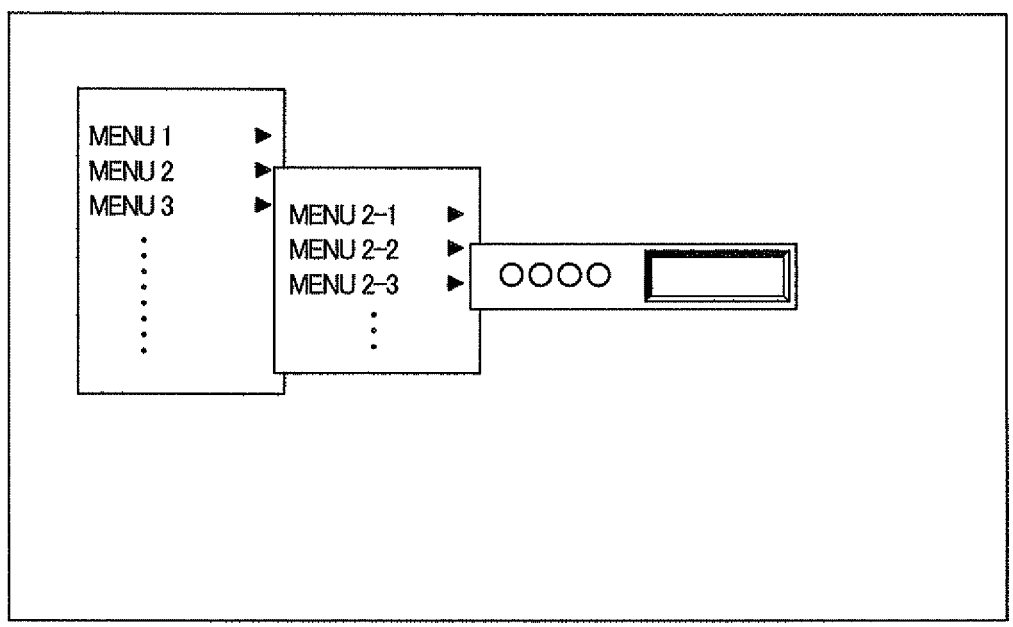
FIG. 8 is a drawing depicting examples of a pop-up menu relating to a preferred embodiment of the present invention.

FIG. 8 illustrates a display example of a case where the pop-up menu has a hierarchical structure. In this example, by selecting "menu 2" in the first level, the related level 2 is displayed, and from within, by selecting "menu 2-2", e.g., an input form providing a text box for parameter input is displayed.

As above, we have explained concerning an embodiment of the present invention; however, the present invention is not restricted to the above-described embodiment. Furthermore, the effects described in the embodiment of the present invention are only a recitation of the most preferable effects generated by the invention, and effects by the invention are not restricted to those described in the embodiment of the present invention.

The invention claimed is:

1. A method for displaying a pop-up menu on a display unit and accepting input of parameters from a user for software running on a computer operated by the user, the method comprising:
    (a) accepting a data indicating at least one selection out of a plurality of objects displayed on the display unit through an input unit of the computer;
    (b) reading a partial list of processing items pre-associated with each of the at least one selection from the plurality of objects;
    (c) accepting a data indicating a request for displaying the pop-up menu through the input unit of the computer;
    (d) displaying the pop-up menu based on the partial list, at a position on the display unit indicated by the data indicating the request;
    (e) displaying a form for accepting input of parameters for a processing item selected on the pop-up menu in response to accepting a data indicating a selection of one processing item from the partial list through the input unit while continuing a display of the pop-up menu, where the form comprises a radio button and a text box;
    (f) accepting an input data entered into the form through the input unit, and storing the input data as parameters of the selected processing item;
    (g) clearing the display of the form and displaying another form corresponding to another processing item differing from the selected processing item, if another processing item is selected during the display of the form; and
    (h) providing an execute interface element for instructing the computer to execute the selected processing item corresponding to the displayed form, where the form further comprises the execute interface element, selection of the execute interface element causing the computer to execute the selected processing item using the parameters input in the form at (f),
    wherein when data indicates plural objects are selected at (a), the displaying of the pop-up menu at (d) is performed based on the partial list corresponding to the selected plural objects.

2. The method according to claim 1, wherein the list is a tree structure composed of a plurality of levels, and the method further comprising displaying a pop-up menu based on processing items included in a lower level, in a case in which the processing item is selected for which the lower level exists.

3. The method according to claim 1, further comprising clearing the display of the pop-up menu and the form, in a case in which the input unit indicates a portion of the display unit other than a portion of the pop-up menu and the form displayed on the display unit.

4. The method according to claim 1, wherein, in accepting the data indicating the request for displaying the pop-up menu, a position on the display unit indicated by the input unit is not restricted to a position at which the selected object is displayed.

5. The method according to claim 1, wherein processing items included in the list and not included in the partial list are displayed as not selectable in the pop-up menu.

6. A non-transitory computer-readable storage device encoded with a computer program, which displays a pop-up menu on a display unit of a computer operated by a user, and which accepts input of parameters from the user for software running on the computer, the computer-readable storage device including instructions to implement a method comprising:
    (a) accepting a data indicating at least one selection out of a plurality of objects displayed on the display unit through an input unit of the computer;
    (b) reading a partial list of processing items pre-associated with each of the at least one selection from the plurality of objects;
    (c) accepting a data indicating a request for displaying the pop-up menu through the input unit of the computer;
    (d) displaying the pop-up menu based on the partial list, at a position on the display unit indicated by the data indicating the request
    (e) displaying a form for accepting input of the parameters for a processing item selected on the pop-up menu in response to accepting a data indicating a selection of one processing item from the partial list through the input unit while continuing a display of the pop-up menu, where the form comprises a radio button and a text box;
    (f) accepting an input data entered into the form through the input unit, and storing the input data as a parameter of the selected processing item;
    (g) clearing a display of the form and displaying another form corresponding to another processing item different from the selected processing item, if another processing item is selected during the display of the form; and
    (h) providing an execute interface element for instructing the computer to execute the selected processing item corresponding to the displayed form, where the form further comprises the execute interface element, selection of the execute interface element causing the computer to execute the selected processing item using the parameters input in the form at (f),
    wherein when data indicates plural objects are selected at (a), the displaying of the pop-up menu at (d) is performed based on the partial list corresponding to the selected plural object.

7. The non-transitory computer-readable storage device according to claim 6, wherein the list is a tree structure composed of a plurality of levels, and the method further comprises displaying a pop-up menu based on processing items included in a lower level in a case in which the processing item is selected for which the lower level exists.

8. The non-transitory computer-readable storage device according to claim 6, wherein the method further comprises clearing the display of the pop-up menu and the form, in a case in which the input unit indicates a portion of the display unit other than a portion of the pop-up menu and the form displayed on the display unit.

9. The non-transitory computer-readable storage device according to claim 6, wherein, in accepting the data indicating the request for displaying the pop-up menu, a position on the display unit indicated by the input unit is not restricted to a position at which the selected object is displayed.

10. The non-transitory computer-readable storage device according to claim 6, wherein processing items included in the list and not included in the partial list are displayed as not selectable in the pop-up menu.

\* \* \* \* \*